United States Patent
Xu et al.

(10) Patent No.: US 11,132,392 B2
(45) Date of Patent: Sep. 28, 2021

(54) IMAGE RETRIEVAL METHOD, IMAGE RETRIEVAL APPARATUS, IMAGE RETRIEVAL DEVICE AND MEDIUM

(71) Applicant: BOE TECHNOLOGY GROUP CO., LTD., Beijing (CN)

(72) Inventors: Jingtao Xu, Beijing (CN); Jianwen Suo, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 89 days.

(21) Appl. No.: 16/561,858

(22) Filed: Sep. 5, 2019

(65) Prior Publication Data

US 2020/0334287 A1  Oct. 22, 2020

(30) Foreign Application Priority Data

Apr. 17, 2019  (CN) .......................... 201910308711.8

(51) Int. Cl.
*G06F 16/583* (2019.01)
*G06K 9/62* (2006.01)
(Continued)

(52) U.S. Cl.
CPC ......... *G06F 16/583* (2019.01); *G06K 9/6201* (2013.01); *G06K 9/629* (2013.01); *G06N 3/0454* (2013.01); *G06N 3/08* (2013.01)

(58) Field of Classification Search
None
See application file for complete search history.

(56) References Cited

U.S. PATENT DOCUMENTS

2010/0272325 A1* 10/2010 Veldhuis .................. G06K 9/46
  382/115
2015/0278254 A1* 10/2015 Bhardwaj ................ G06K 9/52
  382/305

(Continued)

FOREIGN PATENT DOCUMENTS

CN  103714122 A  *  4/2014
CN  106548192 A  *  3/2017
(Continued)

OTHER PUBLICATIONS

Yun Zahi, et al; "Visual Attention Detectino in Video Sequences Using Spatiotemporal Cures", Reference paper; MM '06 Proceedings of the 14th ACM International conference on Multimedia; Oct. 2006.

*Primary Examiner* — Jiangeng Sun

(57) ABSTRACT

Disclosed are an image retrieval method, an image retrieval apparatus, an image retrieval device and a computer-readable storage medium, wherein the image retrieval method including: extracting global features of an input image and obtaining a global feature code based on the global features; extracting content features of the input image and obtaining a content feature code based on the content features; splicing the global feature code with the content feature code to obtain a composite feature code of the input image; comparing the composite feature code with alternative feature codes in a feature code library to obtain an image retrieval result. By comprehensively considering the global features and the content features of the input image in the image retrieval process, the accuracy and retrieval efficiency of the retrieval results can be improved.

20 Claims, 6 Drawing Sheets

(51) Int. Cl.
*G06N 3/08* (2006.01)
*G06N 3/04* (2006.01)

(56) References Cited

U.S. PATENT DOCUMENTS

| | | | | |
|---|---|---|---|---|
| 2016/0042296 | A1* | 2/2016 | Shan | G06N 20/00 706/11 |
| 2016/0358043 | A1* | 12/2016 | Mu | G06K 9/6217 |
| 2018/0107902 | A1* | 4/2018 | Yang | G06F 16/50 |
| 2018/0157681 | A1* | 6/2018 | Yang | H03M 13/1575 |
| 2018/0174579 | A1* | 6/2018 | Henry | G06N 3/02 |
| 2018/0285682 | A1* | 10/2018 | Najibi | G06K 9/6289 |

FOREIGN PATENT DOCUMENTS

| | | | |
|---|---|---|---|
| CN | 107239565 A | * | 10/2017 |
| CN | 107480261 A | | 12/2017 |
| CN | 107679250 A | | 2/2018 |
| CN | 108334901 A | | 7/2018 |

* cited by examiner

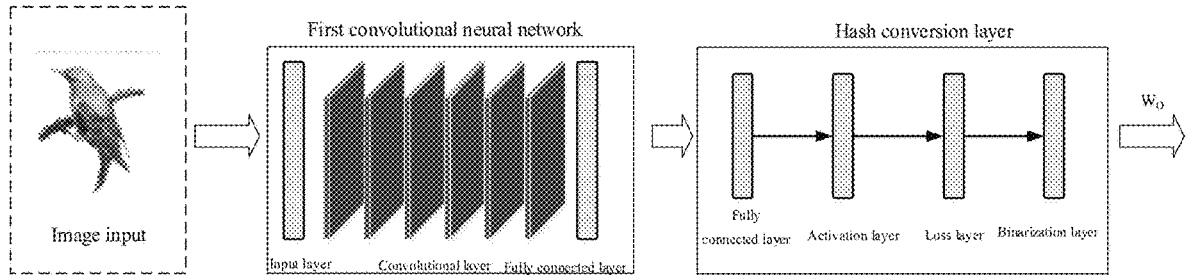

- S211 Generating a sample set based on an image in an image library
- S212 Inputting the sample set to the first convolutional neural network, and obtaining an output result at the fully connected layer after processing by multiple convolutional layers in the first convolutional neural network
- S213 Calculating the loss function of the process result, and adjusting each layer parameter of the first convolutional neural network based on the loss function
- S214 saving the trained first convolutional neural network

FIG. 2C

IMAGE RETRIEVAL METHOD, IMAGE RETRIEVAL APPARATUS, IMAGE RETRIEVAL DEVICE AND MEDIUM

CROSS-REFERENCE TO RELATED APPLICATIONS

The present application claims the priority of Chinese Patent Application No. 201910308711.8, filed Apr. 17, 2019, the entire disclosure of which is incorporated by reference herein.

TECHNICAL FIELD

The present disclosure relates to the field of image processing, and more particularly, to an image retrieval method, an image retrieval apparatus, an image retrieval device and a medium.

BACKGROUND

Image retrieval is a key technology in the field of image processing. With the wide application of image processing in the civil and commercial fields, image retrieval is also facing higher requirements. At present, the method commonly used in image retrieval is obtaining overall features or global features based on an input image, and further retrieving through the global features, and finally outputting an image similar to the input image.

SUMMARY

In view of the above problems, the present disclosure provides an image retrieval method, an image retrieval apparatus, an image retrieval device and a medium.

According to one aspect of the present disclosure, there is provided an image retrieval method, including: extracting global features of an input image and obtaining a global feature code based on the global features; extracting content features of the input image and obtaining a content feature code based on the content features; splicing the global feature code with the content feature code to obtain a composite feature code of the input image; comparing the composite feature code with alternative feature codes in a feature code library to obtain an image retrieval result.

In some embodiments, extracting global features of the input image and obtaining the global feature code based on the global features includes: extracting features of the input image through a first convolutional neural network to obtain global features; converting the global features into a binarized feature code having a first number of bits to obtain the global feature code.

In some embodiments, wherein the first number of bits may be less than, equal to, or greater than a dimensionality of the global features.

In some embodiments, wherein extracting features of the input image through the first convolutional neural network to obtain global features includes: inputting the input image to an input layer of the first convolutional neural network; processing the input image by convolutional layers of the first convolutional neural network to obtain a first processing result; processing the first processing result by a fully connected layer of the first convolutional neural network to obtain global features.

In some embodiments, wherein converting the global features into a binarized feature code having a first number of bits may be implemented by the hashing coding algorithm.

In some embodiments, wherein converting the global features into a binarized feature code having a first number of bits includes: inputting the global features to a fully connected layer, and obtaining a global mapping vector through the processing of the fully connected layer; inputting the global mapping vector to a activation layer, and obtaining a global activation vector through the processing of the activation layer; inputting the global activation vector to a loss layer, and obtaining a global result vector through the processing of the loss layer; inputting the global result vector to a binarization layer, and obtaining the binarized feature code having the first number of bits through the processing of the binarization layer.

In some embodiments, wherein extracting content features of the input image and obtaining the content feature code based on the content features includes: positioning a target in the input image through a second convolutional neural network to obtain a positioning result; clipping the input image based on the positioning result to obtain a local area image, the local area image comprising at least the target; extracting content features from the local area image through a third convolutional neural network; converting the content features into a binarized feature code having a second number of bits to obtain the content feature code.

In some embodiments, wherein positioning the target in the input image through the second convolutional neural network to obtain the positioning result includes: inputting the input image to an input layer of the second convolutional neural network; processing the input image by convolutional layers of the second convolutional neural network to obtain a second processing result; processing the second processing result by a global average pooling layer of the second convolutional neural network to obtain a global pooling result; processing the global pooling result by a fully connected layer of the second convolutional neural network to obtain the positioning result.

In some embodiments, wherein extracting content features from the local area image through the third convolutional neural network includes: inputting the local area image to an input layer of the third convolutional neural network; processing the local area image by convolutional layers of the third convolutional neural network to obtain a third processing result; processing the third processing result by a fully connected layer of the third convolutional neural network to obtain the content features.

In some embodiments, comparing the composite feature code with the alternative feature codes in the feature code library to obtain the image retrieval result includes: calculating a Hamming distance between the composite feature code and each of the alternative feature codes in the feature code library; and determining the image retrieval result based on the Hamming distances.

In some embodiments, wherein the feature code library includes at least two alternative feature codes, and wherein for each image in an image library, global features of the image are extracted and a global feature code of the image is obtained based on the global features; content features of the image are extracted and a content feature code of the image is obtained based on the content features; the global feature code of the image is spliced with the content feature code of the image to obtain a composite feature code of the image, and the composite feature code is regarded as the alternative feature code.

In some embodiments, wherein before extracting features of the input image through the first convolutional neural network to obtain global features, the method further includes: generating a sample set based on an image in an image library; training the first convolutional neural network through the sample set; saving the trained first convolutional neural network.

In some embodiments, wherein before positioning the target in the input image through the second convolutional neural network to obtain the positioning result, the method further includes: generating a sample set based on an image in an image library; training the second convolutional neural network through the sample set; saving the trained second convolutional neural network.

In some embodiments, wherein before extracting content features from the local area image through the third convolutional neural network to obtain content features, the method further includes: generating a sample set based on an image in an image library; training the third convolutional neural network through the sample set; saving the trained third convolutional neural network.

According to another aspect of the present disclosure, there is provided an image retrieval apparatus, including: a global feature processor, which is configured to extract global features of an input image and obtain a global feature code based on the global features; a content feature processor, which is configured to extract content features of the input image and obtain a content feature code based on the content features; a composite feature code generator, which is configured to splice the global feature code with the content feature code to obtain a composite feature code of the input image; a feature comparator, which is configured to compare the composite feature code with alternative feature codes in a feature code library to obtain an image retrieval result.

In some embodiments, wherein the global feature processor includes: a global feature extractor, which is configured to extract features of the input image through a first convolutional neural network to obtain global features; a global feature code generator, which is configured to convert the global features into a binarized feature code having a first number of bits to obtain the global feature code.

In some embodiments, wherein the content feature processor includes: a target locator, which is configured to position a target in the input image through a second convolutional neural network to obtain a positioning result; a local area image generator, which is configured to clip the input image based on the positioning result to obtain a local area image, the local area image including at least the target; a content feature extractor, which is configured to extract content features from the local area image through a third convolutional neural network; a content feature code generator, which is configured to convert the content features into a binarized feature code having a second number of bits to obtain the content feature code.

In some embodiments, wherein the feature comparator includes: a Hamming distance calculator, which is configured to calculate a Hamming distance between the composite feature code and each of the alternative feature codes in the feature code library; and an image output unit, which is configured to determine the image retrieval result based on the Hamming distances.

In some embodiments, wherein the feature code library includes at least two alternative feature codes, and wherein for each image in an image library, global features of the image are extracted and a global feature code of the image is obtained based on the global features; content features of the image are extracted and a content feature code of the image is obtained based on the content features; the global feature code of the image is spliced with the content feature code of the image to obtain a composite feature code of the image, and the composite feature code is regarded as the alternative feature code.

According to another aspect of the present disclosure, there is provided an image retrieval device, wherein the image retrieval device includes a processor and a memory, the memory includes computer-readable instructions that, when executed by the processor, cause the image retrieval device to perform the method as described above.

According to another aspect of the present disclosure, there is provided a computer-readable storage medium having stored thereon computer-readable instructions, the method as described above is performed when the instructions are executed by a computer.

BRIEF DESCRIPTION OF THE DRAWINGS

In order to more clearly explain the embodiments of the present disclosure, in the following the drawings needed in the description of the embodiment will be briefly introduce. Obviously, the drawings in the following description are only some embodiments of the present disclosure. For those of ordinary skill in the art, other drawings can be obtained according to these drawings without creative work. The following drawings are focused on showing the gist of the present disclosure, not schematically scaled by actual dimensions.

FIG. 2B illustrates an exemplary network structure employed by the method in FIG. 2A;

FIG. 2C illustrates an exemplary flow chart of training a first convolutional neural network in accordance with an embodiment of the present disclosure;

DETAILED DESCRIPTION OF THE EMBODIMENTS

Hereinafter, the technical solutions in the embodiments of the present disclosure will be described in a clear and complete way with reference to the accompanying drawings. Obviously, these described embodiments are merely parts of the embodiments of the present disclosure, rather than all of the embodiments thereof. Other embodiments obtained by a person of ordinary skill in the art based on the embodiments of the present disclosure without paying creative effort all fall into the protection scope of the present disclosure.

As used herein, the singular forms "a", "an" and/or "the" may be intended to include the plural forms as well, unless the context clearly indicates otherwise. Generally, the terms "include" and "comprise" are intended to include only the steps and elements that are specified, but these steps and elements do not constitute an exclusive list, and the method or device may also include other steps or elements.

Although the present disclosure makes various references to certain modules in the system in accordance with the embodiments of the present disclosure, any number of different modules can be used and executed on a user terminal and/or a server. The modules are merely illustrative, and different aspects of the systems and methods may use different modules.

Flowcharts are used in the present disclosure to illustrate operations executed by the system in accordance with the embodiments of the present disclosure. It should be understood that the preceding or subsequent steps are not necessarily performed in the precise order. Instead, the respective steps may be processed in the reverse order or simultaneously as needed. Also, other operations may be added to these procedures, or one or more steps may be removed from these procedures.

As mentioned above, image retrieval methods based on global feature images are often used in the current image retrieval. However, when using image retrieval methods based on global features, if the retrieval is performed for some special images, such as art painting images, photos of artworks, or other images with more prominent or core content, the retrieval results tend to be similar in color and texture, while ignoring similarity of content in the painting. Therefore, an image retrieval method with higher image retrieval accuracy under the premise of implementing image retrieval is desired.

Figure 1:
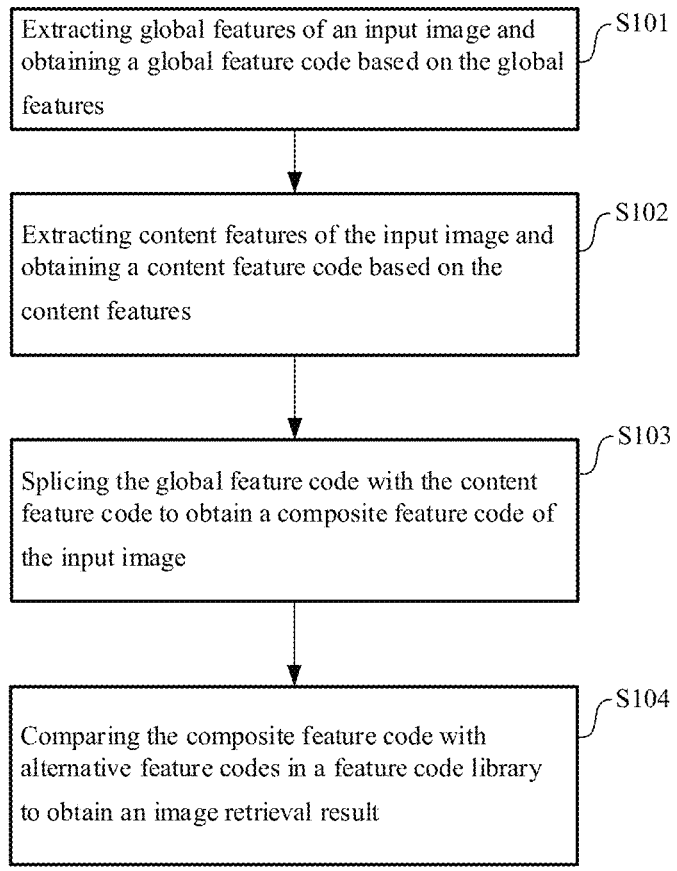
FIG. 1 illustrates an exemplary flow chart of an image retrieval method 100 in accordance with an embodiment of the present disclosure.

FIG. 1 illustrates an exemplary flow chart of an image retrieval method 100 in accordance with an embodiment of the present disclosure.

First, in step S101, global features of an input image are extracted and a global feature code is obtained based on the global features.

The input image may be an image captured in real time by a camera or a video recording device, or may be also an image obtained in advance in other manners. Embodiments of the present disclosure are not limited by the source of the input image and the manner in which it is obtained. For example, it may be an image directly captured by a road camera, a surveillance camera of an unmanned supermarket, or the like, or may be also an image obtained after pre-processing by a computer.

Next, in step S102, content features of the input image are extracted and a content feature code is obtained based on the content features.

The process of extracting global features and content features of the input image may be implemented by a deep learning algorithm, or may be implemented in other manners, embodiments of the present disclosure are not limited by the manner in which global features and content features of the image are extracted.

It should be understood that the operations of steps S101 and S102 may be performed in parallel or sequentially, and no limitations are made thereto. Further, steps S101 and S102 may be performed based on different images obtained after pre-processing or local feature extraction as needed, as long as the images are all derived from the same original input image.

After the global feature code and the content feature code are obtained, further, in step S103, the global feature code is spliced with the content feature code to obtain a composite feature code of the input image. This splicing process may be obtained, for example, by directly connecting the global feature code and the global feature code.

For example, if the obtained global feature code is ($w_1$, $w_2$, $w_3$), and the obtained content feature code is ($c_1$, $c_2$, $c_3$, $c_4$, $c_5$), after they are spliced in order, and the composite feature code ($w_1$, $w_2$, $w_3$, $c_1$, $c_2$, $c_3$, $c_4$, $c_5$) corresponding to the current input image can be obtained.

Further, according to needs, in the splicing process, each sub-elements of the global feature code and the content feature code may first be classified according to different categories to which they belong or based on the requirements of subsequent discrimination, then the global feature code and the content feature code which subordinate to the same category are grouped and spliced. Embodiments of the present disclosure are not limited by the splicing manner selected.

For example, the obtained global feature code is ($w_a$, $w_b$, $w_d$), and the obtained content feature code is ($c_{a1}$, $c_{a2}$, $c_{b1}$, $c_{b2}$, $c_d$), wherein $w_a$, $c_{a1}$, $c_{a2}$ all characterize, for example, color features of the image, $w_b$, $c_{b1}$, $c_{b2}$ all characterize, for example, texture features of the image, $w_d$ and $c_d$ both characterize, for example, shape features of the image, and then they are spliced based on different categories to obtain the composite feature code ($w_a$, $c_{a1}$, $c_{a2}$, $w_b$, $c_{b1}$, $c_{b2}$, $w_d$, $c_d$) corresponding to the current input image.

After the composite feature code is obtained by splicing, in step S104, the composite feature code is compared with alternative feature codes in a feature code library to obtain an image retrieval result.

The above comparison process may be implemented by calculating a spatial distance between the composite feature code and the alternative feature codes, or may also implemented by comparing and judging the corresponding data in the two and generating a final comparison result based on the respective comparing and judging result. Embodiments of the present disclosure are not limited by the comparative manner.

Image retrieval is realized by extracting global features and content features in the input image, generating the corresponding global feature code and content feature code respectively, and splicing the global feature code and the content feature code to obtain the composite feature code, overall similarity of the image and core content similarity of the image are comprehensively considered in the retrieval process, which solves the problem that during image retrieval, especially image retrieval of the art painting, content similarity and accuracy of the retrieval result are low, realizes high-precision retrieval, and further improves retrieval efficiency.

Figure 2A:
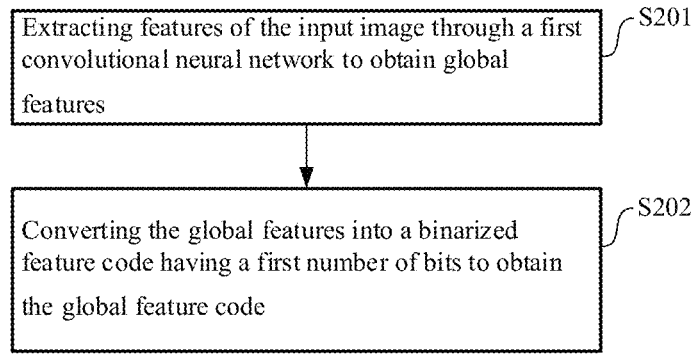
FIG. 2A illustrates an exemplary flowchart of extracting global features of an input image and obtaining a global feature code based on the global features in accordance with an embodiment of the present disclosure.

FIG. 2A illustrates an exemplary flowchart of extracting global features of an input image and obtaining a global feature code based on the global features in accordance with an embodiment of the present disclosure. FIG. 2B illustrates an exemplary network structure employed by the method in FIG. 2A.

Referring to FIG. 2A, first, in Step S201, features of the input image are extracted through a first convolutional neural network to obtain global features.

The first convolutional neural network may be selected based on actual needs, for example, it may be implemented by adopting a convolutional neural network algorithm of a depth residual network (Resnet) model, a convolutional neural network algorithm (R-CNN) based on a visual geometric group (VGG) model, a convolutional neural network algorithm based on an Inception model, or a composite neural network formed by integrating a convolutional neural network algorithm with a fully connected network or other integrated processing network architecture. Herein, no limitation is made on the type of the first convolutional neural network selected.

This step may be implemented, for example, via the first convolutional neural network shown in FIG. 2B. Specifically, first, an image is inputted to an input layer of the first convolutional neural network, thereafter, the image is processed by convolutional layers of the first convolutional neural network to obtain a first processing result, and finally the first processing result is processed by a fully connected layer of the first convolutional neural network to obtain global features. The obtained global features may be in the form of a multi-dimensional global feature vector, such as 4096-dimensional or 2048-dimensional. For example, it may be a feature vector of 2048 dimensions, its specific composition is (6.24, 0.98, 3.12, −1.46, . . . 0.32). Embodiments of the present disclosure are not limited by the dimensionality of the feature vector of the obtained global features and the specific values thereof.

After the global features are obtained, in step S202, the global features are converted into a binarized feature code having a first number of bits to obtain the global feature code.

The first number of bits may be, for example, less than, equal to, or greater than a dimensionality of a feature vector of the global features. For example, the first number of bits may be, for example, 512 bits, or may also be 1024 bits. Embodiments of the present disclosure are not limited by the specific numeric of the first number of bits that is set and its relationship with the dimensionality of the feature vector of the global features.

Herein, the binarized feature code characterizes each bit of the code to be 0 or 1. The binarized feature code may be in the form of a vector, an array, or a string, and embodiments of the present disclosure are not limited by the form of the binarized feature code.

By converting the extracted continuous global features into a binarized feature code with the first number of bits, it is helpful to simplify the calculation and improve the retrieval speed in the subsequent retrieval process.

The conversion process of the binarized feature code may be implemented by, for example, the hashing coding algorithm, or may be also implemented by other manner, and embodiments of the present disclosure are not limited by the manner in which the binarized feature code is obtained.

When implemented by adopting the hash coding algorithm, referring to the non-limiting embodiment shown in FIG. 2B, after the fully connected layer of the convolutional neural network, for example, a hash conversion layer is also provided, the hash conversion layer may include, for example, a fully connected layer, an activation layer, a loss layer, and a binarization layer.

Further, the hash coding process can be described in more detail. For example, if the obtained global feature vector is an m-dimensional vector $W_T$, and the first number of bits set for the global feature code is n, then the m-dimensional global feature vector $W_T$ is first mapped into an n-dimensional global mapping vector $W_S$ in the fully connected layer. Thereafter, in the activation layer, the global mapping vector $W_S$ is converted into a global activation vector $W_Q$ by using a hyperbolic tangent function, that is, a tan h function, and the value of each sub-element in the global activation vector $W_Q$ is constrained to the range of −1 to 1. Then, the global activation vector $W_Q$ is outputted to the loss layer, and in the loss layer, target structure optimization is performed with respect to the global activation vector to compensate for the error caused by discretization of the continuous value code.

In some embodiments, error calculation in the loss layer may be implemented, for example, using an S-type growth curve function (Sigmoid), or may be implemented using a method that takes account of both cross-entropy loss and quantization loss, and embodiments of the present disclosure are not limited by the specific method of error calculation.

When implemented using a method that takes into account both cross entropy loss and quantization loss, the loss function may be:

$$F = \min L + \lambda Q \tag{1}$$

where F characterizes the loss function, L characterizes the cross entropy loss, Q characterizes the quantization loss, and $\lambda$ is a parameter used to weigh the cross entropy loss L and the quantization loss Q and can be selected based on the features of the image. The cross entropy loss L and the quantization loss Q may also select different functions based on the features of the image. Embodiments of the present disclosure are not limited by the specifically selected function and algorithm.

The obtained global result vector $W_R$ calculated by the loss function is further outputted to the binarization layer, in the binarization layer, threshold binarization processing is performed on the global result vector $W_R$, which performs threshold binarization with respect to each sub-element $W_{R\_i}$ (i=1, . . . , n) of the global result vector $W_R$ based on a preset threshold, and the specific formula is as follows:

$$W_{O\_i} = \begin{cases} 1, & W_{R\_i} > 0 \\ 0, & W_{R\_i} \leq 0 \end{cases} \tag{2}$$

where $W_{O\_i}$ is the i-th sub-element in the global feature code $W_O$, and i=1, . . . , n, n is the first number of bits. For example, when the global result vector $W_R$ is (1, −1, 1, 1, 1, −1), based on the above formula, the finally obtained global feature code $W_O$ is (1, 0, 1, 1, 1, 0).

By converting the extracted continuous global features into the binarized feature code with the first number of bits, it is helpful to simplify the calculation and improve the retrieval speed in the subsequent retrieval process. Furthermore, through error calculation, feature loss caused by discretizing the continuous values into a binarized code is compensated for, what's more, the speed and feature accuracy of the retrieval are both considered.

In addition, the first convolutional neural network described above may be trained by using existing image libraries.

FIG. 2C illustrates an exemplary flow chart of training a first convolutional neural network 210 in accordance with an embodiment of the present disclosure. The process of training the first convolutional neural network described above can be described in more detail with reference to the above figures.

Referring to FIG. 2C, for the first convolutional neural network, first, in step S211, a sample set is generated based on an image in an image library. The sample set may be, for example, sample images generated by performing an image enhancement process on the image, such as performing a left-right flip or a color de-mean operation on the image in the image library. Next, the first convolutional neural network is trained through the sample set. Specifically, in step S212, the sample set is inputted to the first convolutional neural network, and an output result is obtained at the fully connected layer after processing by multiple convolutional layers in the first convolutional neural network; in step S213, the loss function of the output result is calculated, each layer parameter of the first convolutional neural network is adjusted based on the loss function; finally, in step S214, the trained first convolutional neural network is saved for implementing image retrieval.

Figure 3A:
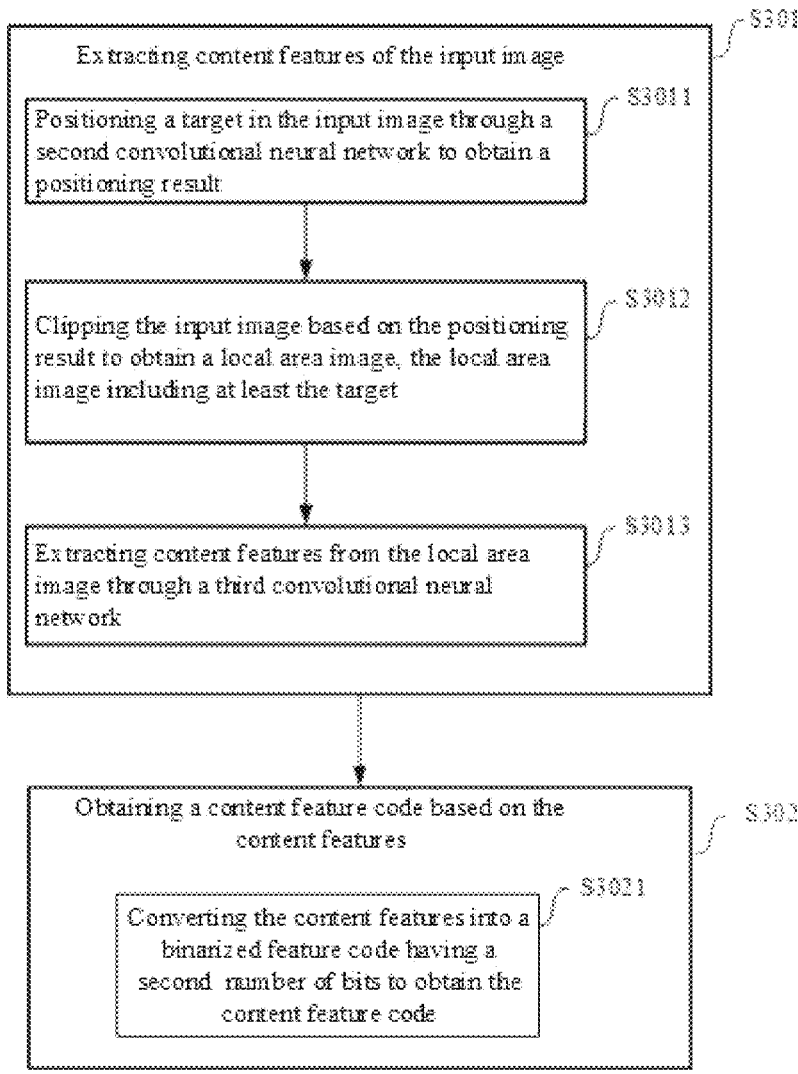
FIG. 3A illustrates a flowchart of an exemplary method 300 of extracting content features of the input image and obtaining a content feature code based on the content features in accordance with an embodiment of the present disclosure.
Figure 3B:
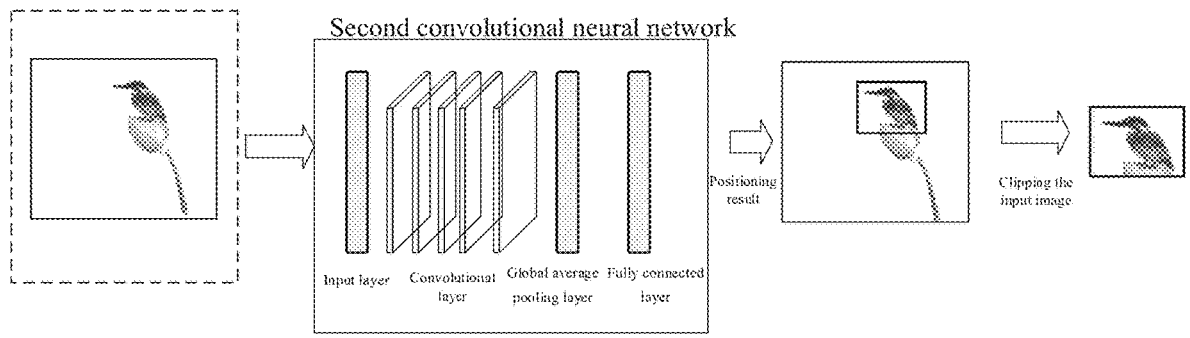
FIG. 3B illustrates an exemplary network structure employed by the method in FIG. 3A.

FIG. 3A illustrates a flowchart of an exemplary method 300 of extracting content features of the input image and obtaining a content feature code based on the content features in accordance with an embodiment of the present disclosure. FIG. 3B illustrates an exemplary network structure employed by the method in FIG. 3A.

First, in step S301, content features of the input image are extracted.

Specifically, in step S3011, a target in the input image is positioned through a second convolutional neural network to obtain a positioning result.

According to different embodiments, the second convolutional neural network may implement target localization based on different preset rules. For example, red may be specified as the target color, or the target located in the middle of the image may be specified as the target, or the target may be specified according to the time domain rule and the frequency domain rule, for example, it is set that in the Spectrum Scale-Space after an image is smoothed by the Gaussian, the saliency area with the smallest entropy is the target, or it is set that the area having a high contrast with respect to the surrounding area after the input image is filtered is the target, and embodiments of the present disclosure are not limited the rules set for selecting the target.

The second convolutional neural network may be, for example, a deep convolutional neural network, a network formed by a combination of a neural network and an intersection ratio algorithm, a non-maximum suppression algorithm, or the like, or a composite neural network formed by integration of a neural network with other fully connected network or other comprehensive network architecture. Embodiments of the present disclosure are not limited by the type of the second convolutional neural network.

The target in the input image may be one, or may be multiple, and embodiments of the present disclosure are not limited by the number of the target in the input image.

Further, as shown in FIG. 3B, for example, an input image may be inputted to an input layer of the second convolutional neural network selected, followed by being processed by convolutional layers in structure of the second convolutional neural network to obtain a second processing result, then the second processing result is outputted to the global average pooling layer (GAP) of the second convolutional neural network, and is processed by the global average pooling layer to obtain a global pooling result, finally the global pooling result is processed by a fully connected layer of the second convolutional neural network to obtain the positioning result, and the positioning result of the target in the image is obtained at the output terminal of the second convolutional neural network.

The positioning result may be represented by a coordinate vector. For example, for each target in the image, it is possible to adopt four corner coordinates of a rectangular area including the target and having the smallest area, its positioning result may be denoted by offsets from the four corner points of the rectangular area to the center point of the input image. However, according to an embodiment of the present disclosure, the positioning result may also be a circular or irregular closed figure surrounding the target and having a minimum area, and embodiments of the present disclosure do not limit the manner of denoting the positioning result.

After the positioning result is obtained, in step S3012, the input image is clipped based on the positioning result to obtain a local area image, and the local area image includes at least the target.

For example, when only one target is included in an image, the local area image includes the one target, which may be, for example, an image including the target. When multiple targets are included in an image, for example, three targets are included, the local area image is an image including the three targets.

The local area image may be, for example, a rectangular image, or may be also a circular image or an irregular image based on a specific shape of the target, and embodiments of the present disclosure makes no limitation to the shape and size of the local area.

Finally, in step S3013, content features are extracted from the local area image through a third convolutional neural network to obtain the content features.

Specifically, the local area image is inputted to the input layer of the third convolutional neural network, and the local area image is processed by convolutional layers of the third convolutional neural network to obtain a third processing result, finally the third processing result is processed by a fully connected layer of the third convolutional neural network to obtain the content features. The obtained content features may be a multi-dimensional feature vector, such as 2048-dimensional or 1024-dimensional. For example, it may be a 2048-dimensional content feature vector $C_T$, and its specific composition is (16.11, 10.23, 3.14, −1.64, . . . 0.32). Embodiments of the present disclosure are not limited by dimensionality of the feature vector of the obtained content features and its concrete value.

The third convolutional neural network may be selected based on actual needs, for example, it may be implemented by adopting a convolutional neural network algorithm of a depth residual network (Resnet) model, a convolutional neural network algorithm (R-CNN) based on a visual geometric group (VGG) model, a convolutional neural network algorithm based on an Inception model, or a composite neural network formed by integrating it with a fully connected network or other integrated processing network architecture. Herein, no limitation is made to the type of the third convolutional neural network selected.

In some embodiments, the third convolutional neural network may have, for example, the same neural network structure as the first convolutional neural network.

However, embodiments of the present disclosure are not limited thereto, and for example, the third convolutional neural network may have a different network structure from the first convolutional neural network. In an embodiment of the present disclosure, no limitation is made to the network structure relationship of the third convolutional neural network and the first convolutional neural network.

The content features in the image can be extracted by positioning the target in the image, clipping the input image based on the positioning result, obtaining a local area image including all the targets of the image and having the smallest area, and performing further feature extraction on the local area image, thereby extracting. Moreover, when the content features are extracted, interference from attribute features of the background area and the non-target area in the image can be effectively reduced, which is advantageous for obtaining more accurate content features.

In addition, the third convolutional neural network may be trained by using the training data in the existing image library.

Figure 3C:
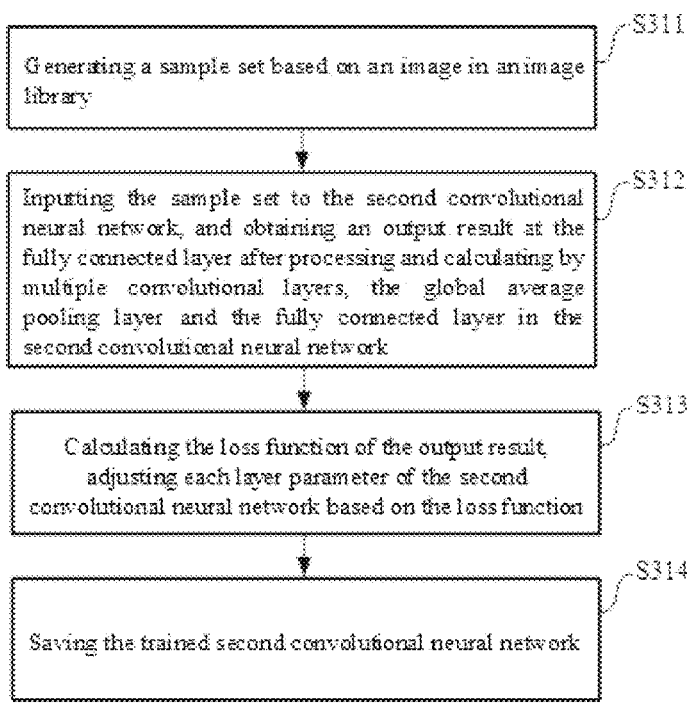
FIG. 3C illustrates an exemplary flow chart of training a second convolutional neural network in accordance with an embodiment of the present disclosure.
Figure 3D:
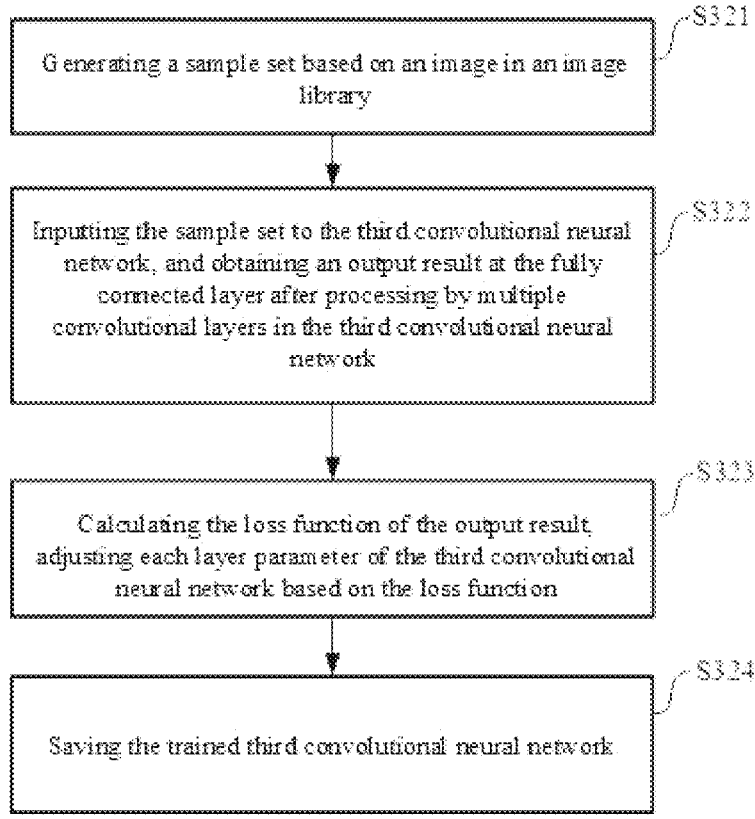
FIG. 3D illustrates an exemplary flow chart of training a third convolutional neural network in accordance with an embodiment of the present disclosure.

FIG. 3C illustrates an exemplary flow chart of training a second convolutional neural network 310 in accordance with an embodiment of the present disclosure; FIG. 3D illustrates an exemplary flow chart of training a third convolutional neural network 320 in accordance with an embodiment of the present disclosure.

Referring to the above figures, the training process of the convolutional neural network may be described in more detail. Referring to FIG. 3C, for the second convolutional neural network, first, in step S311, a sample set is generated based on an image in an image library. The sample set may be, for example, sample images generated by performing an image enhancement process on the image, such as performing a left-right flip or a color de-mean operation on the image in the image library. Next, the second convolutional neural network is trained through the sample set. Specifically, in step S312, the sample set is inputted to the second convolutional neural network, and an output result is obtained at the fully connected layer after processing and calculating by multiple convolutional layers, the global average pooling layer and the fully connected layer in the second convolutional neural network; in step S313, the loss function of the output result is calculated, each layer parameter of the second convolutional neural network is adjusted based on the loss function; finally, in step S314, the trained second convolutional neural network is saved for implementing image retrieval.

Referring to FIG. 3D, the training process of the third convolutional neural network may be described in more detail. For the third convolutional neural network, first, in step S321, a sample set is generated based on an image in an image library. The sample set may be, for example, sample images generated by performing an image enhancement process on the image, such as performing a left-right flip or a color de-mean operation on the image in the image library. Next, the third convolutional neural network is trained through the sample set. Specifically, in step S322, the sample set is inputted to the third convolutional neural network, and an output result is obtained at the fully connected layer after processing by multiple convolutional layers in the third convolutional neural network; in step S323, the loss function of the output result is calculated, and each layer parameter of the third convolutional neural network is adjusted based on the loss function; finally, in step S324, the trained third convolutional neural network is saved for implementing image retrieval.

Exemplarily, the image library may be, for example, a gallery of art works in the Internet or a local image library, wherein the image may be an image captured by a camera in real time or an art image processed by a computer, or the like. Embodiments of the present disclosure are not limited by the image library and the source and type of the images.

The sample set generated via the image may, for example, directly take the image as a sample. However, embodiments of the present disclosure are not limited thereto, and in some embodiments, generating a sample set includes performing image enhancement processing on an image, the enhancement processing includes, for example, selecting an image in an existing image library, and translating to augment sample size and diversity of the training data.

By performing image enhancement processing on the image, data training amount and data diversity of the convolutional neural network can be further improved, performance of the trained convolutional neural network is further enhanced, and thereby the speed and accuracy of image retrieval are improved.

After obtaining the content features, in step S302, a content feature code is obtained based on the content features. Specifically, in step S3021, the content features are converted into a binarized feature code having a second number of bits to obtain the content feature code.

The second number of bits may be, for example, less than, equal to, or greater than a dimensionality of the feature vector of the content features. For example, the second number of bits may be, for example, 512 bits, or may also be 1024 bits. Embodiments of the present disclosure are not limited by the specific numeric of the second number of bits that is set and its relationship with the dimensionality of the feature vector of the content features.

The second number of bits may be the same as the first number of bits, for example, both of them are set to 512 bits, or the two may be different, for example, the second number of bits of the content feature code is 128, the first number of bits of the global feature code is 512. Embodiments of the present disclosure are not limited by the relationship between the first number of bits and the second number of bits that are set.

By converting the extracted features into a binarized feature code with the second number of bits, it is helpful to simplify the calculation and improve the retrieval speed in the subsequent retrieval process.

The conversion process of the binarized feature code may be implemented by, for example, the hashing coding algorithm, that is, a hash conversion layer is provided after the fully connected layer of the convolutional neural network, the hash conversion layer may include, for example, a fully connected layer, an activation layer, a loss layer, and a binarization layer.

Further, for example, if the obtained content feature vector is a y-dimensional vector $C_T$, and the second number of bits set for the content feature code is k, then the y-dimensional content feature vector $C_T$ is first mapped into a k-dimensional content mapping vector $C_S$ in the fully connected layer. Thereafter, in the activation layer, the continuous content mapping vector $C_S$ is converted into a content activation vector $C_Z$ by using a hyperbolic tangent function, the value of each sub-element in the content activation vector $C_Z$ is constrained to the range of −1 to 1. Then, the content activation vector $C_Z$ is outputted to the loss layer, and in the loss layer, target structure optimization is performed with respect to the content activation vector to compensate for the error caused by discretization of the continuous value code.

In some embodiments, error calculation in the loss layer may be implemented, for example, using an S-type growth curve function (Sigmoid), or may be implemented using a method that takes account of both cross-entropy loss and quantization loss. The algorithm used for error calculation of content features may be the same as the algorithm used for error calculation of global features, or different algorithms may be selected based on their different features. Embodiments of the present disclosure are not limited by the specific method by which content features are subjected to error calculation.

The obtained content result vector $C_R$ calculated by the loss function is further outputted to the binarization layer, in which threshold binarization processing is performed on the content result vector $C_R$, which performs threshold binarization with respect to each sub-element of the content result vector $C_R$ based on the preset threshold, and the specific formula is as follows:

$$C_{O\_i} = \begin{cases} 1, & C_{R\_i} > 0 \\ 0, & C_{R\_i} \leq 0 \end{cases} \quad (3)$$

where $C_{O\_i}$ is the i-th sub-element in the content feature code $C_O$, and i=1, ..., k, k is the second number of bits. When the content result vector $C_R$ is (−1, −1, −1, 1, 1, −1), based on the above formula, the finally obtained global feature code $C_O$ is (0, 0, 0, 1, 1, 0).

By converting the extracted continuous content features into the binarized feature code with the second number of bits, it is helpful to simplify the calculation and improve the retrieval speed in the subsequent retrieval process. Furthermore, through error calculation, feature loss caused by coding, discretizing the continuous values into a binarized code is compensated for, speed and feature accuracy are both considered.

Figure 4:
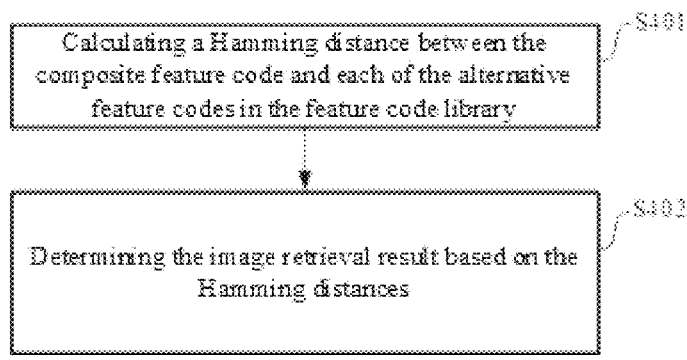
FIG. 4 illustrates a flow chart of an exemplary method 400 of comparing a composite feature code with alternative feature codes in a feature code library to obtain an image retrieval result in accordance with an embodiment of the present disclosure.

FIG. 4 illustrates a flow chart of an exemplary method 400 of comparing the composite feature code with alternative feature codes in a feature code library to obtain an image retrieval result in accordance with an embodiment of the present disclosure.

Referring to FIG. 4, after the global feature code is spliced with the content feature code to obtain a composite feature code, first, in step S401, a Hamming distance between the composite feature code and each of the alternative feature codes in the feature code library is calculated.

The feature code library includes at least two alternative feature codes, and the specific process of obtaining the alternative feature codes is similar to steps S101 to S103 in the image retrieval method 100. Specifically, first, for each image in an image library, global features of an image in an image library are extracted and a global feature code of the image is obtained based on the global features; next, content features of the image are extracted and a content feature code of the image is obtained based on the content features; and last, the global feature code of the image is spliced with the content feature code of the image to obtain a composite feature code of the image which is regarded as the alternative feature code.

Based on this, the alternative feature codes are equal to the composite feature code of the input image in length (vectors of the two have the same dimensionality).

The Hamming distance refers to a number of sub-elements at corresponding positions in two codes/two vectors whose values differ from each other. For example, if the code A is 100 and the code B is 101, the Hamming distance between the codes A and B is 1.

Based on the above, the process of calculating the Hamming distance between the composite feature code and each of the alternative feature codes in the feature code library and obtaining the corresponding value can be described in more detail. For example, the composite feature code D of the input image obtained by processing is (1, 1, 1, 0, 0, 1, 0, 1, 0), the first alternative feature code $G_1$ of the feature code library is (1, 1, 0, 0, 0, 1, 0, 1, 1), the second alternative feature code $G_2$ of the feature code library is (0, 0, 0, 1, 0, 1, 0, 1, 0), the Hamming distance between D and $G_1$ is 2, and the Hamming distance between D and $G_2$ is 4.

Further, in step S402, the image retrieval result is determined based on the Hamming distances.

The above process of determining the image retrieval result can be described in more detail. For example, in some embodiments, based on the Hamming distances, an image corresponding to an alternative feature code having a minimum Hamming distance is outputted. For example, when the first alternative feature code $G_1$ has a minimum Hamming distance, only the image corresponding to the first alternative feature code $G_1$ is outputted.

However, the present disclosure is not limited thereto. For example, images corresponding to alternative feature codes whose Hamming distances are less than or equal to a preset threshold may be outputted. Specifically, the alternative feature codes are filtered based on a preset threshold of the Hamming distance, images corresponding to one or more alternative feature codes whose Hamming distances are less than or equal to a preset threshold may be outputted.

The preset threshold may be, for example set to 5, or may be set to 10. Embodiments of the present disclosure are not limited by the specific numeric of the preset threshold.

For example, when the preset threshold is 5, for the composite feature code D of the input image, it can be compared with each of the alternative feature codes in the feature code library to attain a corresponding Hamming distance, and the alternative feature codes can be sorted according to the their Hamming distances, for example from small to large, if the Hamming distance with respect to the first alternative feature code $G_1$ is 2, the Hamming distance with respect to the second alternative feature code $G_2$ is 4, and the Hamming distance with respect to each of the remaining alternative feature codes is greater than 5, the images corresponding to the first alternative feature code $G_1$ and the second alternative feature code $G_2$ may be outputted correspondingly.

In some embodiments, the alternative feature codes may also be outputted according to the Hamming distances from small to large if the number of outputted alternative feature codes is less than a preset output number.

For example, when there are 7 alternative feature codes in the feature code library, and the preset output number is 8, at this time, since the number of all the alternative feature codes is less than the preset output number, the images corresponding to the 7 alternative feature codes are all outputted; when there are 7 alternative feature codes in the feature code library, the order of the Hamming distances from small to large is, for example, $G_1 < G_2 < G_3 < G_4 < G_5 < G_6 < G_7$, when the preset output number is 4, the images corresponding to the feature codes $G_1$, $G_2$, $G_3$, $G_4$ are outputted in the order of the Hamming distances from small to large.

Compared with the way of calculating the spatial distances to achieve retrieval, calculating the Hamming distances to realize the retrieval process has lower calculation amount, and faster calculation speed, which helps to improve the retrieval speed.

By using the image retrieval method provided by the present disclosure, image retrieval accuracy and retrieval efficiency thereof can be effectively improved on the basis of achieving image retrieval, and high-precision image retrieval is realized, and the method has good robustness.

Figure 5:
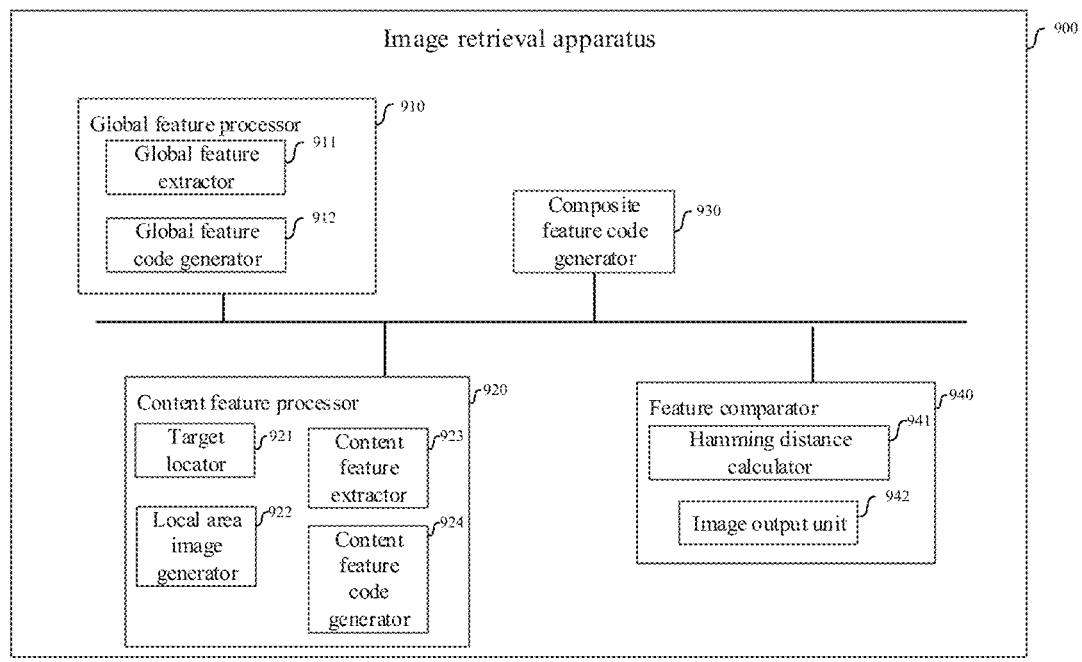
FIG. 5 shows an exemplary block diagram of an image retrieval apparatus 900 in accordance with an embodiment of the present disclosure.

FIG. 5 shows an exemplary block diagram of an image retrieval apparatus 900 in accordance with an embodiment of the present disclosure.

The image retrieval apparatus 900 shown in FIG. 5 comprises a global feature processor 910, a content feature processor 920, a composite feature code generator 930, and a feature comparator 940, the image retrieval apparatus 900 can perform the image retrieval method as shown in FIG. 1.

The global feature processor 910 is configured to extract global features of an input image and obtain a global feature code based on the global features. The content feature processor 920 is configured to extract content features of the input image and obtain a content feature code based on the content features. The composite feature code generator 930 is configured to splice the global feature code with the content feature code to obtain a composite feature code of the input image. The feature comparator 940 is configured to compare the composite feature code with alternative feature codes in a feature code library to obtain an image retrieval result.

The input image may be an image captured in real time by a camera or a video recording device, or may be also an image obtained in advance in other manners. Embodiments of the present disclosure are not limited by the source of the input image and the manner in which it is obtained. For example, it may be an image directly captured by a road camera, a surveillance camera of an unmanned supermarket, or the like, or may be also an image obtained after pre-processing by a computer.

The process of comparing the composite feature code and the alternative feature codes in the feature code library may be implemented by calculating a spatial distance between the composite feature code and each of the alternative feature code, or may also implemented by comparing and judging the corresponding data in the two and generating a final comparison result based on the respective comparing and judging results. Embodiments of the present disclosure are not limited by the comparing manner.

Image retrieval is realized by extracting global features and content features in the input image, generating the corresponding global feature code and content feature code respectively, and splicing the global feature code and the content feature code to obtain the composite feature code, overall similarity of the image and core content similarity of the image are comprehensively considered in the retrieval process, which solves the problem that during image retrieval, especially image retrieval of the art painting, content similarity and accuracy of the retrieval result are low, realizes high-precision retrieval, and further improves retrieval efficiency.

The global feature processor 910 may further include a global feature extractor 911 and a global feature code generator 912, the global feature processor 910 can execute the flows shown in FIG. 2, extracting global features of the input image and obtaining the global feature code based on the global features.

The global feature extractor 911 is configured to execute the operation in step S201 in FIG. 2, extracting features of the input image through a first convolutional neural network to obtain global features. It may be implemented by adopting a convolutional neural network algorithm of a depth residual network (Resnet) model, a convolutional neural network algorithm (R-CNN) based on a visual geometric group (VGG) model, a convolutional neural network algorithm based on an Inception model, or a composite neural network formed by integrating a convolutional neural network algorithm with a fully connected network or other integrated processing network architecture. Herein, no limitation is made on the type of the first convolutional neural network selected.

Further, the global feature code generator 912 is configured to execute the operation in step S201 in FIG. 2, converting the global features into a binarized feature code having a first number of bits to obtain the global feature code.

By converting the extracted continuous global features into the binarized feature code with the first number of bits, it is helpful to simplify the calculation and improve the retrieval speed in the subsequent retrieval process. Furthermore, through the error compensation process, the error induced by discretizing the continuous values into a binarized code can be compensated for, and both of the retrieval speed and the feature accuracy are taken into consideration.

The content feature processor 920 further includes: a target locator 921, a local area image generator 922, a content feature extractor 923 and a content feature code generator 924, the content feature processor can execute the flows shown in FIG. 3A, extracting content features of the input image and obtaining a content feature code based on the content features.

The target locator 921 is configured to execute the operation in step S3011 of FIG. 3A, positioning a target in the input image through a second convolutional neural network to obtain a positioning result. The target in the input image may be one, or may be multiple, and embodiments of the present disclosure are not limited by the number of the target in the input image.

The positioning result may be represented by a coordinate vector. For example, for each target in the image, it is possible to adopt four corner coordinates of a rectangular area including the target and having the smallest area, its positioning result may be denoted by offsets from the four corner points of the rectangular area to the center point of the input image. However, according to an embodiment of the present disclosure, the positioning result may also be a circular or irregular closed figure surrounding the target and having a minimum area, the positioning result of the target may also be denoted in accordance with other criteria according to needs, and embodiments of the present disclosure make no limitation to the manner of denoting the positioning result.

The local area image generator 922 is configured to execute the operation in step S3012 of FIG. 3A, clipping the input image based on the positioning result to obtain a local area image, the local area image including at least the target.

The local area image may be, for example, a rectangular image, or may be also a circular image or an irregular image based on a specific shape of the targets, and embodiments of the present disclosure make no limitation to the shape and size of the local area.

The content feature extractor 923 is configured to execute the operation in step S3013 of FIG. 3A, extracting content features from the local area image through a third convolutional neural network.

The content feature code generator 924 is configured to execute the operation in step S3021 of FIG. 3A, converting the content features into a binarized feature code having a second number of bits to obtain the content feature code.

By positioning the target in the image, clipping the input image based on the positioning result, obtaining a local area image, and performing further feature extraction on the local area image, thereby the content features in the image can be extracted. Moreover, when the content features are extracted, interference from attribute features of the background area and the non-target area in the image can be effectively reduced, which is advantageous for obtaining more accurate content features.

The feature comparator 940 may further comprise a Hamming distance calculator 941, and an image output unit 942. The feature comparator 940 can execute the flows shown in FIG. 4, comparing the composite feature code with alternative feature codes in a feature code library to obtain an image retrieval result.

The Hamming distance calculator 941 is configured to execute the operation in step S401 of FIG. 4, calculating a Hamming distance between the composite feature code and each of the alternative feature codes in the feature code library. The image output unit 942 is configured to execute the operation in step S402 of FIG. 4, determining the image retrieval result based on the Hamming distances.

In some embodiments, the feature code library includes at least two alternative feature codes, wherein for each image in an image library, global features of the image in an image library are extracted and a global feature code of the image is obtained based on the global features; content features of the image are extracted and a content feature code of the image is obtained based on the content features; and the global feature code of the image is spliced with the content feature code of the image to obtain a composite feature code of the image, the composite feature code of the image is regarded as the alternative feature code.

Compared with the way of calculating the spatial distances to achieve retrieval, calculating the Hamming distances to realize the retrieval process has lower calculation amount, and faster calculation speed, which helps to improve the retrieval speed.

Figure 6:
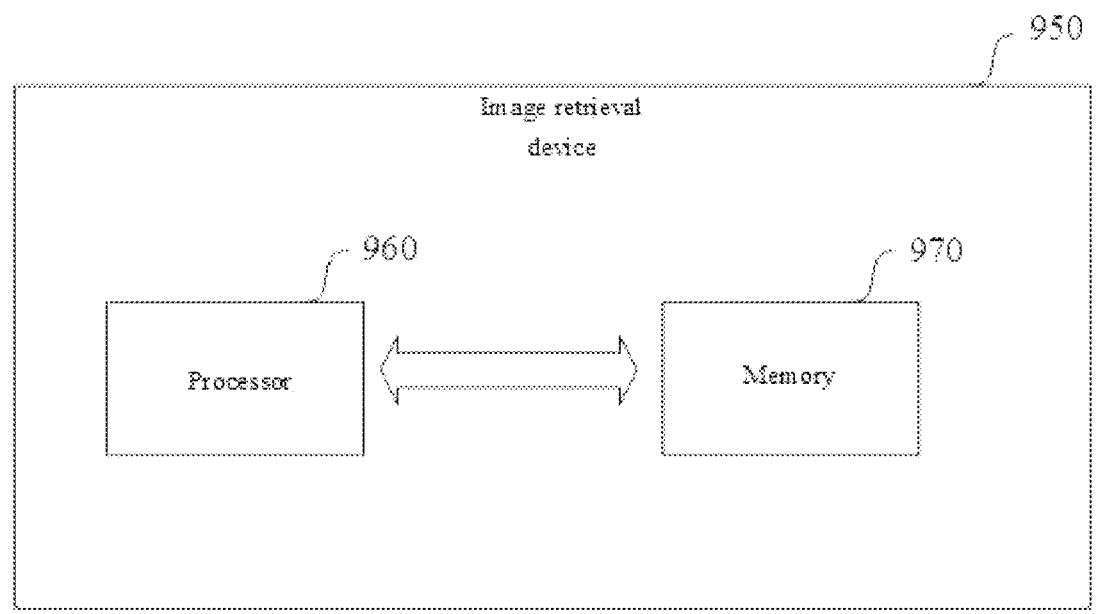
FIG. 6 shows an exemplary block diagram of an image retrieval device 950 in accordance with an embodiment of the present disclosure.

The image retrieval device 950 as shown in FIG. 6 may be implemented as one or more dedicated or general purpose computer system modules or components, such as a personal computer, a notebook computer, a tablet computer, a mobile phone, a personal digital assistance (PDA), and any smart portable device. The image retrieval device 950 may include at least one processor 960 and a memory 970.

The at least one processor is configured to execute program instructions. The memory 970 may be present in the image retrieval device 950 in different forms of program storage units and data storage units, such as a hard disk, a read only memory (ROM), a random access memory (RAM), it can be used for storing various data files used during processor processing and/or in the process of executing image retrieval, as well as possible program instructions executed by the processor. Although not shown in the figures, the image retrieval device 950 may also include an input/output component that supports input/output data streams between the image retrieval device 950 and other components (such as an image acquisition device 980). The image retrieval device 950 may also transmit and receive information and data from a network via a communication port.

In some embodiments, the computer-readable instructions stored by the memory 970, when executed by the processor 960, cause the image retrieval device 950 to execute operations comprising: extracting global features of an input image and obtaining a global feature code based on the global features; extracting content features of the input image and obtaining a content feature code based on the content features; splicing the global feature code with the content feature code to obtain a composite feature code of the input image; comparing the composite feature code with alternative feature codes in a feature code library to obtain an image retrieval result.

In some embodiments, for the sake of extracting global features of the input image and obtaining the global feature code based on the global features, the image retrieval device 950 executes operations comprising: extracting features of the input image through a first convolutional neural network to obtain global features; and converting the global features into a binarized feature code having a first number of bits to obtain the global feature code.

In some embodiments, extracting content features of the input image comprises: positioning a target in the input image through a second convolutional neural network to obtain a positioning result; clipping the input image based on the positioning result to obtain a local area image, the local area image including at least the target; extracting content features from the local area image through a third convolutional neural network.

In some embodiments, obtaining the content feature code based on the content features includes: converting the content features into a binarized feature code having a second number of bits to obtain the content feature code.

In some embodiments, the operation of comparing the composite feature code with the alternative feature codes in the feature code library to obtain the image retrieval result includes: calculating a Hamming distance between the composite feature code and each of the alternative feature codes in the feature code library; and determining the image retrieval result based on the Hamming distances.

In some embodiments, the image retrieval device 950 can receive images acquired from an image acquisition device external to the image retrieval device 950, and perform the image retrieval method described above on the received image data to implement the functions of the image retrieval device described above.

Although the processor 960 and the memory 970 are presented as separate modules in FIG. 6, a person skilled in the art can understand that the above device modules may be implemented as separate hardware devices, or may be also integrated into one or more hardware devices. The specific implementation of different hardware devices should not be taken as factors for limiting the scope of the present disclosure, as long as the principles of the present disclosure can be implemented.

According to another aspect of the present disclosure, there is also provided a non-transitory computer-readable storage medium having stored thereon computer-readable instructions that, when executed by a computer, perform the method as described above.

With the image retrieval method, apparatus and device provided by the present disclosure, image retrieval can be performed well based on global features and content features of the input image, in particular, high image retrieval accuracy can be attained, and the algorithm has good robustness.

Program portions of the technology may be considered to be "product" or "article" that exists in the form of executable codes and/or related data, which are embodied or implemented by a computer-readable medium. A tangible, permanent storage medium may include an internal memory or a storage used by any computers, processors, or similar devices or associated modules. For example, various semiconductor memories, tape drivers, disk drivers, or any similar devices capable of providing storage functionality for software.

All software or parts of it may sometimes communicate over a network, such as the internet or other communication networks. Such communication can load software from one computer device or processor to another. For example, loading from one server or host computer to a hardware environment of one computer environment, or other computer environment implementing the system, or a system having a similar function associated with providing information needed for image retrieval. Therefore, another medium capable of transmitting software elements can also be used as a physical connection between local devices, such as light waves, electric waves, electromagnetic waves, etc., to be propagated through cables, optical cables, or air. Physical medium used for carrying the waves such as cables, wireless connections, or fiber optic cables can also be considered as medium for carrying the software. In usage herein, unless a tangible "storage" medium is defined, other terms referring to a computer or machine "readable medium" mean a medium that participates in execution of any instruction by the processor.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block", "module", "engine", "unit," "module," or "system". Furthermore, aspects of the present disclosure may take the form of a computer program product embodied in one or more computer-readable media having computer-readable program code embodied thereon.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. An image retrieval method, comprising:
   extracting global features of an input image and obtaining a global feature code based on the global features subjected to error calculation, wherein the global feature code is a binarized feature code;
   extracting content features of the input image and obtaining a content feature code based on the content features subjected to error calculation, wherein the content feature code is a binarized feature code;
   splicing the global feature code with the content feature code to obtain a composite feature code of the input image;
   comparing the composite feature code with alternative feature codes in a feature code library to obtain an image retrieval result;
   wherein the error calculation is for compensating for the error caused by discretization of the continuous value code.

2. The image retrieval method of claim 1, wherein extracting global features of the input image and obtaining the global feature code based on the global features comprises:
   extracting features of the input image through a first convolutional neural network to obtain global features;
   converting the global features into a binarized feature code having a first number of bits to obtain the global feature code.

3. The image retrieval method of claim 2, wherein the first number of bits is less than, equal to, or greater than a dimensionality of the global features.

4. The image retrieval method of claim 2, wherein extracting features of the input image through a first convolutional neural network to obtain global features comprises:
   inputting the input image to an input layer of the first convolutional neural network;
   processing the input image by convolutional layers of the first convolutional neural network to obtain a first processing result;
   processing the first processing result by a fully connected layer of the first convolutional neural network to obtain global features.

5. The image retrieval method of claim 2, wherein the converting the global features into a binarized feature code having a first number of bits is implemented by a hashing coding algorithm.

6. The image retrieval method of claim 5, wherein converting the global features into a binarized feature code having a first number of bits comprises:
   inputting the global features to a fully connected layer, and obtaining a global mapping vector through the processing of the fully connected layer;
   inputting the global mapping vector to a activation layer, and obtaining a global activation vector through the processing of the activation layer;
   inputting the global activation vector to a loss layer, and obtaining a global result vector through the processing of the loss layer;
   inputting the global result vector to a binarization layer, and obtaining the binarized feature code having the first number of bits through the processing of the binarization layer.

7. The image retrieval method of claim 1, wherein extracting content features of the input image and obtaining the content feature code based on the content features comprises:

positioning a target in the input image through a second convolutional neural network to obtain a positioning result;

clipping the input image based on the positioning result to obtain a local area image, the local area image comprising at least the target;

extracting content features from the local area image through a third convolutional neural network;

converting the content features into a binarized feature code having a second number of bits to obtain the content feature code.

8. The image retrieval method of claim 7, wherein positioning the target in the input image through the second convolutional neural network to obtain the positioning result comprises:

inputting the input image to an input layer of the second convolutional neural network;

processing the input image by convolutional layers of the second convolutional neural network to obtain a second processing result;

processing the second processing result by a global average pooling layer of the second convolutional neural network to obtain a global pooling result;

processing the global pooling result by a fully connected layer of the second convolutional neural network to obtain the positioning result.

9. The image retrieval method of claim 7, wherein extracting content features from the local area image through the third convolutional neural network comprises:

inputting the local area image to an input layer of the third convolutional neural network;

processing the local area image by convolutional layers of the third convolutional neural network to obtain a third processing result;

processing the third processing result by a fully connected layer of the third convolutional neural network to obtain the content features.

10. The image retrieval method of claim 1, wherein comparing the composite feature code with the alternative feature codes in the feature code library to obtain the image retrieval result comprises:

calculating a Hamming distance between the composite feature code and each of the alternative feature codes in the feature code library; and determining the image retrieval result based on the Hamming distances.

11. The image retrieval method of claim 1, wherein the feature code library comprises at least two alternative feature codes, and wherein for each image in an image library, global features of the image are extracted and a global feature code of the image is obtained based on the global features;

content features of the image are extracted and a content feature code of the image is obtained based on the content features;

the global feature code of the image is spliced with the content feature code of the image to obtain a composite feature code of the image, and the composite feature code is regarded as the alternative feature code.

12. The image retrieval method of claim 2, wherein before extracting features of the input image through the first convolutional neural network to obtain global features, the method further comprises:

generating a sample set based on an image in an image library;

training the first convolutional neural network through the sample set;

saving the trained first convolutional neural network.

13. The image retrieval method of claim 5, wherein before positioning the target in the input image through the second convolutional neural network to obtain the positioning result, the method further comprises:

generating a sample set based on an image in an image library;

training the second convolutional neural network through the sample set;

saving the trained second convolutional neural network.

14. An image retrieval apparatus, comprising:

a global feature processor, which is configured to extract global features of an input image and obtain a global feature code based on the global features subjected to error calculation, wherein the global feature code is a binarized feature code;

a content feature processor, which is configured to extract content features of the input image and obtain a content feature code based on the content features subjected to error calculation, wherein the content feature code is a binarized feature code;

a composite feature code generating processor, which is configured to splice the global feature code with the content feature code to obtain a composite feature code of the input image;

a feature comparison processor, which is configured to compare the composite feature code with alternative feature codes in a feature code library to obtain an image retrieval result;

wherein the error calculation is for compensating for the error caused by discretization of the continuous value code.

15. The image retrieval apparatus of claim 14, wherein the global feature processor comprises:

a global feature extractor, which is configured to extract features of the input image through a first convolutional neural network to obtain global features;

a global feature code generating processor, which is configured to convert the global features into a binarized feature code having a first number of bits to obtain the global feature code.

16. The image retrieval apparatus of claim 14, wherein the content feature processor comprises:

a target locator, which is configured to position a target in the input image through a second convolutional neural network to obtain a positioning result;

a local area image generating processor, which is configured to clip the input image based on the positioning result to obtain a local area image, the local area image comprising at least the target;

a content feature extractor, which is configured to extract content features from the local area image through a third convolutional neural network;

a content feature code generating processor, which is configured to convert the content features into a binarized feature code having a second number of bits to obtain the content feature code.

17. The image retrieval apparatus of claim 14, wherein the feature comparison processor comprises:

a Hamming distance calculator, which is configured to calculate a Hamming distance between the composite feature code and each of the alternative feature codes in the feature code library; and an image output unit, which is configured to determine the image retrieval result based on the Hamming distances.

18. The image retrieval apparatus of claim 14, wherein the feature code library comprises at least two alternative feature codes, and wherein for each image in an image library,
- global features of the image are extracted and a global feature code of the image is obtained based on the global features;
- content features of the image are extracted and a content feature code of the image is obtained based on the content features;
- the global feature code of the image is spliced with the content feature code of the image to obtain a composite feature code of the image, and the composite feature code is regarded as the alternative feature code.

19. An image retrieval device, wherein the image retrieval device comprises a processor and a memory, the memory comprises computer-readable instructions that, when executed by the processor, cause the image retrieval device to perform the method of claim 1.

20. A non-transitory computer-readable storage medium having stored thereon computer-readable instructions, the method of claim 1 is performed when the instructions are executed by a computer.

\* \* \* \* \*